J. CASE.
Seed-Planter.
No. 2,227. Reissued Apr. 17, 1866.
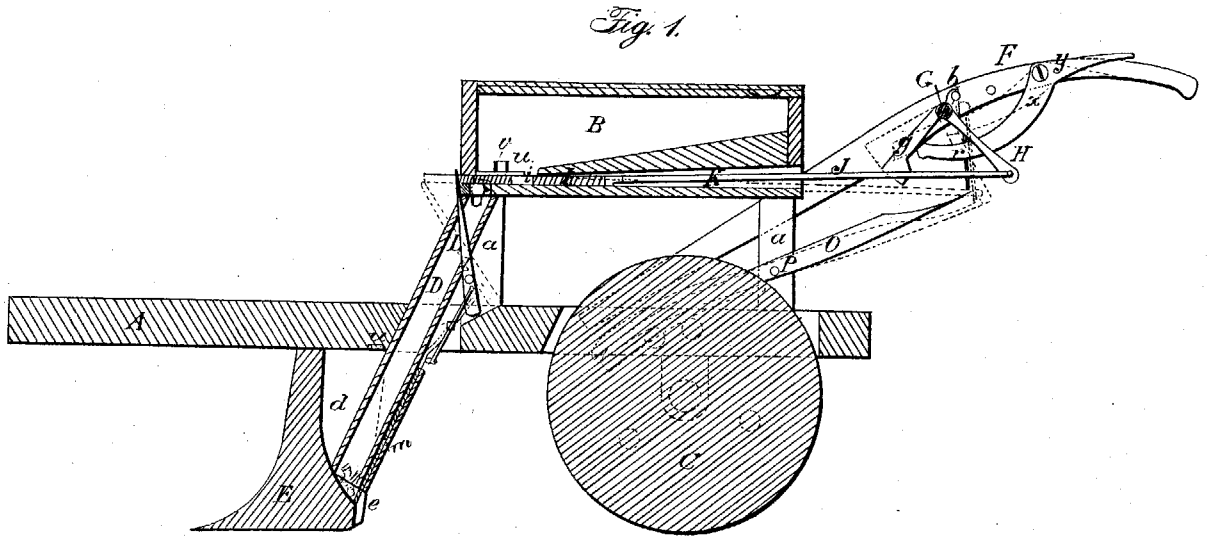
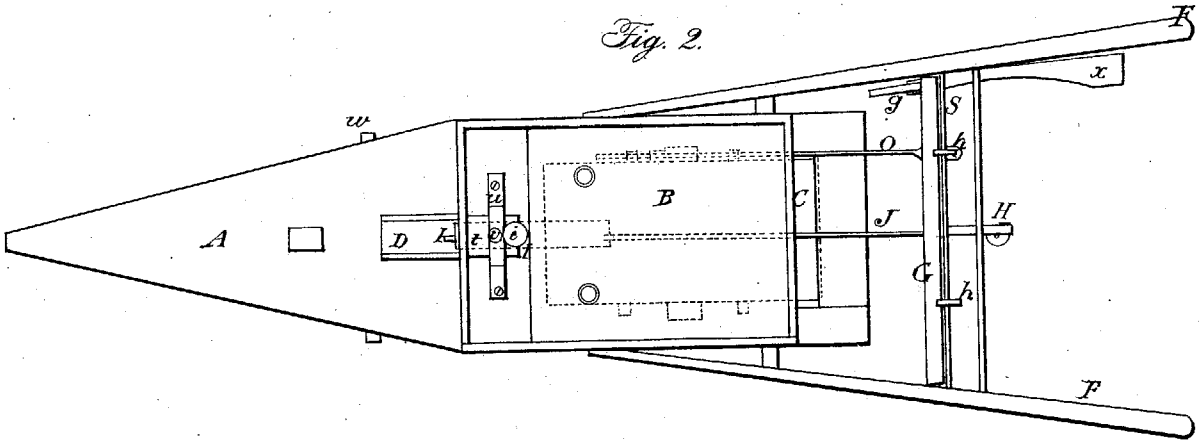
AM. PHOTO-LITHO. CO. N.Y. (OSBORNE'S PROCESS.)

UNITED STATES PATENT OFFICE.

JARVIS CASE, OF SPRINGFIELD, OHIO.

IMPROVEMENT IN CORN-PLANTERS.

Specification forming part of Letters Patent No. 12,231, dated January 16, 1855; Reissue No. 623, dated November 16, 1858; Reissue No. 2,227, dated April 17, 1866.

*To all whom it may concern:*

Be it known that I, JARVIS CASE, of Springfield, county of Clarke, and State of Ohio, have invented certain new and useful Improvements in Machines for Planting Corn and Similar Seeds; and I do hereby declare that the following is a clear, full, and exact description thereof, reference being had to the accompanying drawings, and to the letters of reference marked thereon, which are hereby made a part of this specification.

Figure 1 represents a longitudinal vertical section of my improved machine, taken on a line running through the center. Fig. 2 is a top plan view of the machine.

Similar letters of reference, where they occur on the separate figures, indicate like parts of the machine.

My invention relates to that class of machines which are designed to plant corn in "check-rows;" and it consists in a novel method of combining and arranging a valve in the seed-hopper with another below the hopper in such a manner that by a single impulse or movement of the same a charge of seed shall be dropped from each.

It also further consists in a novel arrangement of devices for operating said valves, and also for converting it at will from a hand to an automatic planter.

Machines have heretofore been constructed in which the seed slides or valves were operated by the use of one or more wheels rolling upon the ground, such machines being termed "automatic," in contradistinction to those in which the valves are operated by the hand of the attendant. Experience has demonstrated that with these automatic machines it is impossible to plant in check-rows with the desired degree of accuracy, for the reason that, as the wheel rolls into depressions and over obstructions, its distance is so changed in different rows that the machine will not plant the hills of one row directly opposite those of the adjoining row. In order to plant in check-rows with accuracy, it is therefore necessary that the machine should be operated by hand, so that the seed may be deposited in the ground at the proper instant. It will also be readily understood that if the seed has to pass the entire distance from the hopper to the furrow at one operation it will be scattered for some distance along the row, as the machine will be moving forward during all the time between the seeds leaving the hopper and their striking the ground, and as the machine will sometimes move faster than at other times, it is impossible, even when operated by hand, for the operator to so time his movements as to deposit the seed at the exact instant required. It is also found by experience that the continuous muscular movement required to operate the valves, when they are so arranged that the muscles must be exerted to move them both forward and backward to plant a single hill, must necessarily be so rapid that it renders correct planting extremely difficult and excessively fatiguing to the operator.

My invention has for its object the removal of these difficulties in check-row planting-machines.

To enable others skilled in the art to construct and use my invention, I will proceed to describe it.

A represents the frame or body of the machine, which is supported near its rear end upon a wheel, B. The forward portion of the frame carries a plow, C, for opening a furrow to receive the seed.

D D represent handles, similar to those of an ordinary plow, by which the operator may guide and control the machine.

E is a seed box or hopper, having its bottom inclined, as shown in Fig. 1, so as to cause the seed to slide forward to the exit provided for it. Underneath this bottom F is placed another bottom, *a*, with a space between them for the seed slide or valve *c* to move in, said slide *c* being provided with a hole, *e*, for receiving a proper quantity of seed to plant a hill and convey it to the upper end of the tube G, down which it passes until it is arrested by the slide or valve *r*, located near the bottom of said tube G, as shown in Fig. 1.

*f* is a cut-off under which the cell *e* is moved by the motion of the slide *c*, a brush, *i*, being so located as to sweep off any surplus seed from the cell *e* prior to the latter discharging its contents into the tube G.

To the rear end of the slide *c* a rod, *s*, is attached, the opposite end of said rod being secured to an elbow-lever, *t*, that is fastened to a rock-shaft, *u*, and to which a drop-weight, *v*, is also attached to aid in restoring the rock-shaft and slide to their original position after being operated by the attendant.

I is a lever pivoted to the handle D at W, one end, *x*, of the same lying close to said handle, so that the operator may work it with facility, the other end, *y*, of said lever being in contact with the weight *v*, so that by pressing down the arm *x* the shaft *n* will be rocked and the seed-slide *c* moved forward, as shown in blue lines in Fig. 1.

An elastic wire, 2, is stretched from one to the other handle D, near to and parallel with the rock-shaft *n*, against which a projection, *h*, on said shaft (see Fig. 2) comes when the said slide is moved forward, as above described, thereby aiding the weight *v* to return the slide and operating parts to their original position, ready for planting another hill.

It is obvious that a weight or spring may either be used alone to secure the return movement of the parts; but their united action gives a vibrating motion to the seed-slide *c* without opening either the valve in the seed-hopper or the one in the seed-tube, thus aiding the cell *e* in slide *c* to fill with a uniform amount of seed. At the lower end of the tube G, I also locate another slide or valve, *r*, which is connected by means of the cord or rod O to the short arm of a lever, *m*, which is pivoted at *n*, the upper end of said lever projecting up so as to be hit by the front end of the upper slide, *c*, when the latter is moved forward. By this means both slides *c* and *r* are operated simultaneously, and a charge of grain is thus dropped from each at one impulse or by one exertion of the muscles. By these means only half as many motions or exertions of the muscles are required as in machines which require the slides to be moved both forward and backward by the operator, and this I deem of great importance, as it always secures a charge of seed on the lower valve in time for the next hill, and it is not so much the amount of power required to operate the slide as it is the frequency and continuous monotony of the movements that renders the operation so excessively fatiguing to the operator.

In check-row planting the operation is as follows: The ground having been marked by rows at proper distances apart in one direction, the operator starts the machine across the field in the direction to cross the previously-made rows at right angles. At the instant that the indicator 7 or the lower end of seed-tube G comes to the cross mark or row he throws down the end of lever I, which carries the charge of grain that is in the cell *e* of slide *c* forward, and empties it into the tube G, the slide *r* being opened by the same movement and letting out the charge that was previously deposited there by the slide *c*, the slide *r* closing again in time to arrest the charge that falls from *c*, and this operation is repeated at the crossing of each row across the entire field. The machine is then turned about and moved back across the field, planting, as it goes, a hill at the crossing of each row directly opposite those previously planted. It will thus be seen that a charge of seed is constantly ready in the bottom of tube G, so that as the machine arrives at the proper point, this seed having but a very short distance to fall, and the movement of the slide being entirely under the control of the operator, the seed may be planted in check-rows with unerring certainty, and with but a single effort on the part of the operator to each discharge of seed.

As it is sometimes desired to plant corn or other seeds in drills, I have added a lever, J, which is pivoted at 4, and has its lower end projecting down so as to be struck by the pins 5, projecting from the side of wheel B, as shown in dotted lines in Fig. 1. The opposite end of this lever J is connected to the projection 3 on the rock-shaft *u* by a link, 6. It will thus be seen that as the machine moves forward the pins 5 will successively hit the lower end of lever J, causing it to vibrate, and thereby operate the seed-slides without the assistance of the operator. This, however, is only intended for drilling and not for check-rowing, which latter is the prime object of my invention.

It will of course be understood that when either one of these plans is used the other will be disconnected, as it is obvious that both cannot be used at once.

It is obvious that many other mechanical arrangements may be substituted for those here shown to operate the seed slides or valves, and I do not therefore desire to be understood as limiting myself to the special devices shown for operating the slides, as they are not considered by me as the gist of my invention, the prime object of my invention being to reduce the muscular movements required to operate the valves, to certainly secure a charge of seed on the lower valve in time for the next hill, and at the same time have each valve pass a charge of seed by a single impulse or movement.

I do not claim broadly the use of two valves so arranged that one of said valves shall pass a charge of seed when moved in one direction and the other passing a charge of seed only on the return movement of the first valve, as I am aware that such have been used by C. Finn, as shown in his model filed in the Patent Office April 23, 1852; but,

Having thus fully described my invention, what I claim is—

1. The seed-slide *c*, lever *m*, rod *o*, and slide *r*, whereby a valve at the seed-hopper of a corn-planter is so connected with another valve below the seed-hopper that by a single impulse or movement a charge of seed shall be dropped from each valve, substantially as described.

2. The combination of lever I, rock-shaft *u*, weight *v*, and wire 2 with lever J, whereby the valves of one corn-planter may not only be operated to produce the double drop of seed described, but will become convertible at will from a hand-planter to an automatic planter, substantially as described.

3. So arranging and connecting a valve at the seed-hopper of a corn-planter with another valve below the hopper, in combination with a lever, that the attendant of the machine as it is moved over the ground, by a single throw of the lever not only discharges the seed from the valve below the hopper at the proper time, but drops a charge from the valve at the seed-hopper to the valve below in readiness for the next hill, substantially as set forth.

4. So combining and arranging the mechanism of a corn-planter's valves that the valve in the seed-hopper and the valve in the seed-tube below the hopper may each be made to drop a charge of seed by a single impulse or movement, substantially as described.

JARVIS CASE.

Witnesses:
GEO. MOWER,
J. K. MOWER.